United States Patent
Richetta et al.

(10) Patent No.: US 10,401,848 B2
(45) Date of Patent: *Sep. 3, 2019

(54) PROTECTION MONITORING SYSTEM WITH FAULT INDICATORS

(71) Applicant: General Electric Company, Schenectady, NY (US)

(72) Inventors: Paul Foster Richetta, Gardnerville, NV (US); Michael Alan Tart, Gardnerville, NV (US); Thomas Franklin Kalb, Gardnerville, NV (US); Kyle Allan Farwell, Gardnerville, NV (US); Curtis Lee Hoffman, Gardnerville, NV (US)

(73) Assignee: General Electric Company, Schenectady, NY (US)

(*) Notice: Subject to any disclaimer, the term of this patent is extended or adjusted under 35 U.S.C. 154(b) by 63 days.

This patent is subject to a terminal disclaimer.

(21) Appl. No.: 15/858,144

(22) Filed: Dec. 29, 2017

(65) Prior Publication Data

US 2018/0120825 A1 May 3, 2018

Related U.S. Application Data (63) Continuation of application No. 13/769,225, filed on Feb. 15, 2013, now Pat. No. 9,869,997.

(51) Int. Cl.
*G06F 19/00* (2018.01)
*G05B 23/02* (2006.01)
(Continued)

(52) U.S. Cl.
CPC ......... *G05B 23/027* (2013.01); *G05B 19/048* (2013.01); *H02H 5/00* (2013.01);
(Continued)

(58) Field of Classification Search
CPC .... G05B 23/027; G05B 19/048; H02H 9/042; H02H 5/08; H02H 5/04; H02H 5/00; H02H 3/044
See application file for complete search history.

(56) References Cited

U.S. PATENT DOCUMENTS 4,218,716 A * 8/1980 Narbus ............... H02H 5/08
                                                361/110
5,586,057 A    12/1996 Patel
(Continued)

FOREIGN PATENT DOCUMENTS

EP    2518457 A2    10/2012
JP    H09-050587 A   2/1997
JP    H11-85265 A    3/1999

OTHER PUBLICATIONS

Sabin, "Understanding Trip Multiply," Orbit Magazine, 2006, pp. 26-27, vol. 26, No. 1.
(Continued)

*Primary Examiner* — Michael D Masinick
(74) *Attorney, Agent, or Firm* — Mintz Levin Cohn Ferris Glovsky and Popeo, P.C.

(57) ABSTRACT

A protection monitoring system is provided that includes a protection fault handler. The protection fault handler includes a protection fault indicator. The protection fault handler is configured to activate the protection fault indicator upon indication of a protection fault signal. Moreover, the protection fault signal is indicative of a critical fault which has occurred in a protection system monitored by the protection monitoring system. The protection monitoring system also includes a user inhibit handler. The user inhibit handler includes a user inhibit indicator. Moreover, the user inhibit handler is configured to activate the user inhibit indicator upon indication of a user inhibit signal. Further-
(Continued)

more, the user inhibit signal is indicative of a user-enabled alarm inhibit or a user-enabled bypass.

20 Claims, 4 Drawing Sheets

(51) Int. Cl.
    *G05B 19/048*    (2006.01)
    *H02H 5/00*    (2006.01)
    *H02H 5/04*    (2006.01)
    *H02H 5/08*    (2006.01)
    *H02H 9/04*    (2006.01)
    *H02H 3/04*    (2006.01)

(52) U.S. Cl.
    CPC ............... *H02H 5/04* (2013.01); *H02H 5/08* (2013.01); *H02H 9/042* (2013.01); *H02H 3/044* (2013.01)

(56) References Cited

U.S. PATENT DOCUMENTS

| | | | |
|---|---|---|---|
| 6,426,856 B1 | 7/2002 | Schneerson et al. | |
| 6,650,523 B1* | 11/2003 | Kleemeier | H02H 3/33 361/47 |
| 9,437,381 B2* | 9/2016 | Hassan-Ali | H01H 47/02 |
| 2004/0027750 A1* | 2/2004 | Minami | H02H 1/0061 361/62 |
| 2005/0012608 A1 | 1/2005 | Havekost | |
| 2006/0015244 A1 | 1/2006 | Hawkins | |
| 2006/0224360 A1* | 10/2006 | Kishimoto | B60L 3/0023 702/183 |
| 2009/0174981 A1 | 7/2009 | Mallon | |
| 2011/0102957 A1 | 5/2011 | Kasper | |
| 2011/0202163 A1 | 8/2011 | Kim | |
| 2012/0109547 A1* | 5/2012 | Willey | H05B 1/0236 702/58 |
| 2012/0274473 A1 | 11/2012 | Heda | |
| 2013/0001022 A1 | 1/2013 | Marien | |
| 2014/0236319 A1* | 8/2014 | Richetta | G05B 19/048 700/80 |
| 2019/0080858 A1* | 3/2019 | Krause | H01H 1/0015 |

OTHER PUBLICATIONS

Machine translation and Notification of Reasons for Refusal issued in connection with corresponding JP 1\pplication No. 2015-558021 dated Sep. 26, 2017.

Mitchell, John S. "From vibration measurements to condition-based maintenance." Sound and Vibration 41.1 (2007): 62.

Anonymous: "Mark* Vle Control Product Description GEI-100600C", Mar. 10, 2010, pp. 1-16.

PCT Search Report and Written Opinion dated May 16, 2014 in connection with corresponding PCT Patent Application No. PCT/US2014/013323.

* cited by examiner

PROTECTION MONITORING SYSTEM WITH FAULT INDICATORS

CROSS-REFERENCE TO RELATED APPLICATION(S)

This application is a continuation of U.S. patent application Ser. No. 13/769,225, entitled "PROTECTION MONITORING SYSTEM WITH FAULT INDICATORS" filed on Feb. 15, 2013, which is herein incorporated by reference in its entirety for all purposes.

BACKGROUND

The subject matter disclosed herein generally relates to protection system monitoring.

Some systems (e.g., industrial automation systems) include machinery (e.g., turbines) that perform various functions. Additionally, some systems include protection systems (e.g., sensors and control systems) that cause the machinery to operate under certain tolerable parameters to reduce the likelihood of the machinery damaging itself, personnel, or other parts of the system. Such protection systems may also include a protection monitoring system that verifies that the protection system is functioning properly and is "ok" (e.g., verifying functionality and connection of sensors of the protection system).

Moreover, these protection systems may provide various methods of suppressing functions of the protection system. For example, an operator may suppress one or more alarms when measured parameters are expected to occur outside of the normal operating conditions (e.g., alarm inhibit during maintenance, trip multiply, etc.). However, when an inhibit, bypass, or fault occurs in the protection system, the protection monitoring system may indicate that the protection system is "not ok" or not functioning properly. Upon notification of a not ok status, a user is unable to determine whether the status results from critical faults, non-critical faults, user inhibits, bypasses, and/or other important system events. Instead, in such systems, the user must investigate a log for the protection system and/or the industrial automation system to determine the cause of the not ok status, thereby reducing the working efficiency of the user and/or cause the user to ignore the not ok status.

BRIEF DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In one embodiment, a protection monitoring system includes a protection fault handler. The protection fault handler includes a protection fault indicator. The protection fault handler is configured to activate the protection fault indicator upon indication of a protection fault signal. Moreover, the protection fault signal is indicative of a critical fault which has occurred in a protection system monitored by the protection monitoring system. The protection monitoring system also includes a user inhibit handler. The user inhibit handler includes a user inhibit indicator. Moreover, the user inhibit handler is configured to activate the user inhibit indicator upon indication of a user inhibit signal. Furthermore, the user inhibit signal is indicative of a user-enabled alarm inhibit or a user-enabled bypass.

In another embodiment, an industrial automation system includes a protection system configured to protect machinery. The industrial automation system further includes a protection monitoring system. The protection monitoring system includes a protection fault relay configured to trip when a first type of alert related to whether a critical fault has occurred in the protection system is detected. The protection monitoring system also includes a user inhibit indicator configured to activate when a second type of alert related to activation of a user-inhibit or user-enabled bypass is detected. Furthermore, the protection monitoring system includes an attention indicator configured to activate when a third type of alert related to fault types not classified as the first or second alert type is detected.

In a further embodiment, a non-transitory, computer-readable medium includes instructions. The instructions are configured to determine whether a first type of alert has occurred. Moreover, the first type of alert is related to whether a fault in a critical path of a protection system has occurred. The instructions are also configured to trip a protection fault relay if the first type of alert has occurred. The instructions are also configured to determine whether a second type of alert has occurred, wherein the second type of alert is related to whether a user-enabled inhibit or user-enabled bypass is active in the protection system. Furthermore, the instructions are configured to activate a user inhibit indicator if the second type of alert has occurred.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, a system is disclosed that sorts faults and inhibit functions into corresponding handlers in a protection monitoring system. For example, a fault protection handler may be dedicated to determining and/or addressing critical faults in a critical path of a protection system for an industrial automation system. By including a handler that is dedicated to critical faults, the nature of detected critical faults may more easily be determined. Additionally, the fault protection handler may be used to shut down machinery 12 with faulted protection and/or the industrial automation system using a fault protection relay without risking shut down for minor faults and/or bypasses. The system may also include additional handlers, such as a user inhibit handler and/or an attention handler. These handlers may be used to sort issues into additional categories. For example, the user inhibit handler may be used to indicate that a user has inhibited or bypassed functions of the protection system, and the attention handler may be used to indicate that non-critical faults have occurred and/or important events in the industrial automation system have not been acknowledged. By sorting these issues into handlers with such granularity, an operator may more quickly determine which faults and/or inhibits are blocking operation of the protection system in the industrial automation system and/or address critical issues via a dedicated relay.

Figure 1:
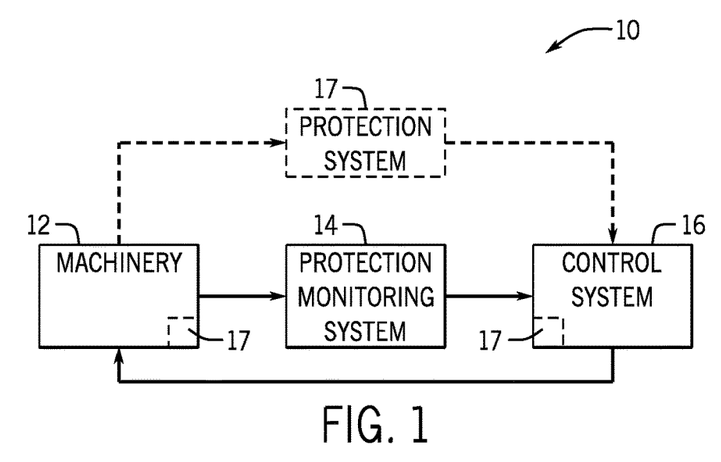
FIG. 1 is a block diagram view of an embodiment of an industrial automation system.

FIG. 1 is a block diagram view of an industrial automation system 10, such as a turbine system or other industrial system that may be automated. The illustrated industrial automation system 10 includes machinery 12, a protection monitoring system 14, and a control system 16. In other embodiments, the industrial automation system 10 may include additional devices, such as monitoring devices. Furthermore, certain embodiments of the industrial automation system 10 may include a protection system 17 integrated into the machinery 12 and/or the control system 16. In some embodiments, the protection system 17 may be separate and distinct from other portions of the industrial automation system 10.

The protection system 17 constrains the control system 16 to operate the machinery 12 to achieve desired goals within various constraints on the machinery 12. In other words, control system 16 and/or the protection system 17 may be used to protect the machinery 12 from damage due to operating parameters varying beyond tolerable levels. For example, in certain embodiments, the control system 16 may include such as a control system similar to that provided in a MK VI or MK VIe made available by General Electric' of Schenectady, N.Y. In some embodiments, the protection monitoring system 14 may include a protection monitoring system similar to a 3500 Series Machinery Protection System with Bently Nevada™ Asset Condition Monitoring also made available by General Electric® of Schenectady, N.Y. The machinery 12 may include mechanically functioning parts of the industrial automation system 10 (e.g., engines, compressors, combustors, conveyer belts, generators, inlet guide vanes (IGV), pumps, turbo expanders, etc.) For example, in embodiments where the industrial automation system 10 is a gas turbine system, the machinery 12 may include a turbine and/or other mechanically functioning parts (e.g., compressor).

Additionally, the protection system 17 may include various system diagnostic and monitoring devices (e.g., sensors, transducers, interconnections therebetween, etc.). The protection monitoring system 14 monitors a functionality and connectivity of the protection system 17. In other words, the protection monitoring system 14 verifies that the machinery 12 is being protected correctly by the protection system 17. In some embodiments, the protection system 17 may include the protection monitoring system 14 essentially integrated into one system that protects the machinery 12 and monitors the status of the protection. In certain embodiments, the protection monitoring system 14 may be implemented using software stored on a computing device (e.g., electronic device having a processor). For example, in some embodiments, the protection monitoring system 14 may be stored as instructions stored on a computer readable medium, such as memory, a disk drive, an optical drive, or other type of storage. In certain embodiments, these instructions may be stored and/or executed by the control system 16, an operator machine, or a remote server. In other embodiments, the protection monitoring system 14 may be implemented using hardware circuitry. For example, in some embodiments, the protection monitoring system 14 may located in a housing enclosing the control system 16. As discussed below, if the protection monitoring system 14 determines that protection system 17 has faulted, the protection monitoring system 14 may address the fault and/or alert a user/operator to indicate that the machinery 12 is not protected.

Figure 2:
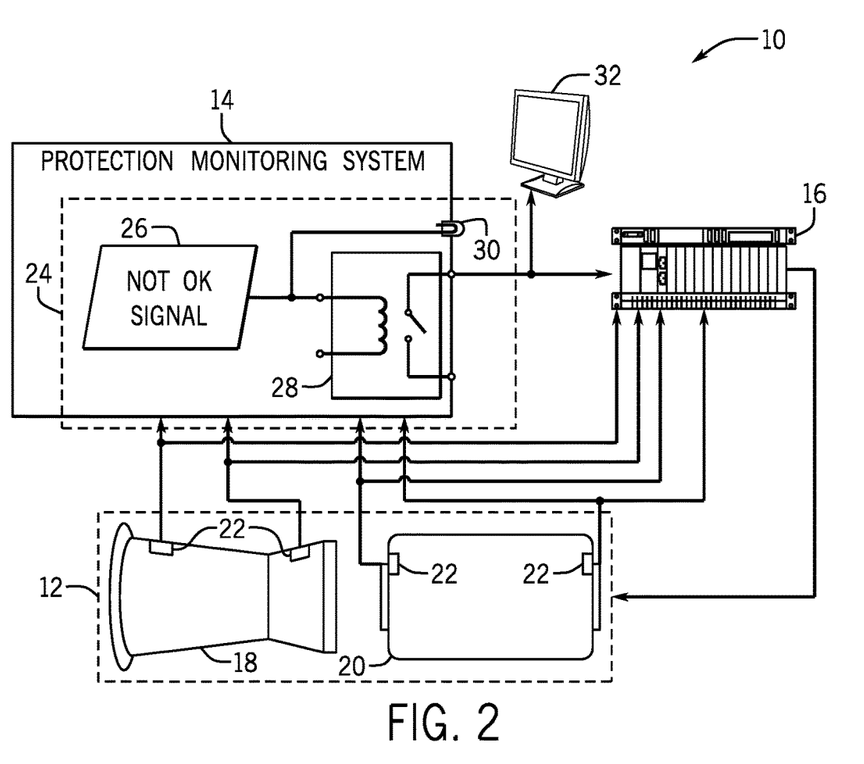
FIG. 2 is a schematic diagram view of an embodiment of the industrial automation system of FIG. 1 with a single alert handler.

FIG. 2 is a schematic diagram view of the industrial automation system 10 including the machinery 12, protection monitoring system 14, and control system 16. Additionally, as illustrated, certain embodiments of the machinery 12 include a turbine 18 and a generator 20. Some embodiments of the machinery 12 may include additional mechanically functioning devices (e.g., compressor, etc.). In some embodiments, the turbine 18, the generator 20, and/or other mechanically functioning devices in the machinery 20 may include one or more sensors 22 that may be used to determine various operating parameters of the machinery 12. In certain embodiments, the sensors 22 may include vibration sensors, temperature sensors, speed sensors, pressure sensors, and/or other suitable sensors capable of measuring various operating parameters of the machinery 12. For example, a sensor 22 configured to measure temperature may be located in the generator 20 to measure a bearing or lube oil temperature of the generator 20 and/or a sensor 22 configured to measure speed may be located in the turbine 18 to determine the speed at which the turbine 18 is rotating. The sensors 22 measure various operating parameter of the machinery 12 and pass the information to the protection monitoring system 14 and/or the control system 16.

Using the information sent by the sensors 22, the control system 16 determines various operating parameters of the machinery 12. For example, to produce more power, the control system 16 may increase the firing temperature in a combustor by adjusting a fuel mixture and/or fuel consumption until the measured temperature approaches a limit set by the control system 16. In some embodiments, if one or more operating parameters (e.g., firing temperature, turbine speed, air pressure, vibration) varies outside a tolerable range, the protection system 17 and/or the control system 16 may adjust one or more related factors (e.g., injecting more fuel, adjust IGV angles) to place the parameter back in the tolerable range. In certain embodiments, when a measured operating parameter varies outside the tolerable range, the control system 16 may shut down the machinery 12 to block damage to the machinery 12.

In the illustrated embodiment, the protection monitoring system 14 includes a single alert handler 24. The protection monitoring system 14 also receives the measured values from the sensors 22 and/or the control system 16. The protection monitoring system 14 and/or the control system 16 verifies that a malfunction has not occurred in the protection of the machinery 12. The protection monitoring system 14 and/or the control system 16 may be used to determine faults (e.g., broken wires), bypasses (e.g., inhibited alarms/protection), firmware issues, and/or additional protection issues. Upon determination of any protection issue (e.g., critical path sensor is malfunctioning), the protection monitoring system 14 generates a NOT OK signal 26 or receives the NOT OK signal 26 from the control system 16. Additionally or alternatively, the protection monitoring system 14 may generate the NOT OK signal 26 upon cessation of a signal (e.g., possible broken wire) from the sensors 22 and/or the control system 16. In certain embodiments, the protection monitoring system 14 then uses the NOT OK signal 26 to activate the single alert handler 24. Upon activation of the single alert handler 24, the protection monitoring system 14 toggles a protection relay 28, toggles a visual alert 30, and/or sends an alert to a human machine interface (HMI) 32 and/or the control system 16. In certain embodiments, the HMI 32 may include input/output devices configured to interface between an operator and the machine (e.g., electronic displays, speakers, mice, keyboard, touchscreen, etc.).

Although the illustrated embodiment includes the protection relay 28 and the visual alert 30, some embodiments may include only the protection relay 28 or the visual alert 30. Moreover, the protection relay 28 may include any suitable electrical switch. For example, the protection relay 28 may include a single pole, single throw switch (SPST) switch; a single pole, double throw switch (SPDT) switch; a single pole center-off (SPCO), a double pole, double throw (DPDT) switch, a double pole, center off (DPCO) switch, another suitable switch, or some combination thereof. In some embodiments, the protection relay 28 may shut down and/or block operation of the machinery 12 until a cause for the NOT OK signal 26 has been addressed. In certain embodiments, the protection relay 28 may be used to alert a user/other component of a presence of an issue in the protection system 17 via the NOT OK signal 26 via the HMI 32 and/or the control system 16. Additionally or alternatively, the visual alert 30 may be used to alert a user of the presence of the NOT OK signal 26. For example, the visual alert 30 may include a light emitting diode that flashes and/or changes colors (e.g., green to red) when the protection monitoring system 14 determines that the NOT OK signal 26 is present.

Although a protection monitoring system 14 having the single alert handler may prevent the machinery 12 from being operated under undesired conditions, the single relay may become congested with non-critical errors. In other words, a single relay may not contain a desired level of granularity being unable to distinguish from critical faults and non-critical issues (e.g., user inhibits). In the illustrated embodiment, if a user forgets to disable an alarm inhibit after the desired period has elapsed (e.g., inhibit alarm during maintenance), the protection monitoring system 14 merely displays that the protection system 17 for the machinery 12 is not ok. A user cannot tell that a user inhibit is active for an alarm. Instead, the user will have to independently determine which error caused the protection monitoring system 14 to trip (e.g., check logs for the protection system 17). Thus, a user/the control system is unable to distinguish between critical faults and non-critical directly from the protection monitoring system 14. Since a user may believe that non-critical issues are more likely than critical faults, the user may simply choose to ignore any alerts or bypass the relay, thereby rendering the single relay inefficient and/or useless to alert the user of the critical alarms.

Figure 3:
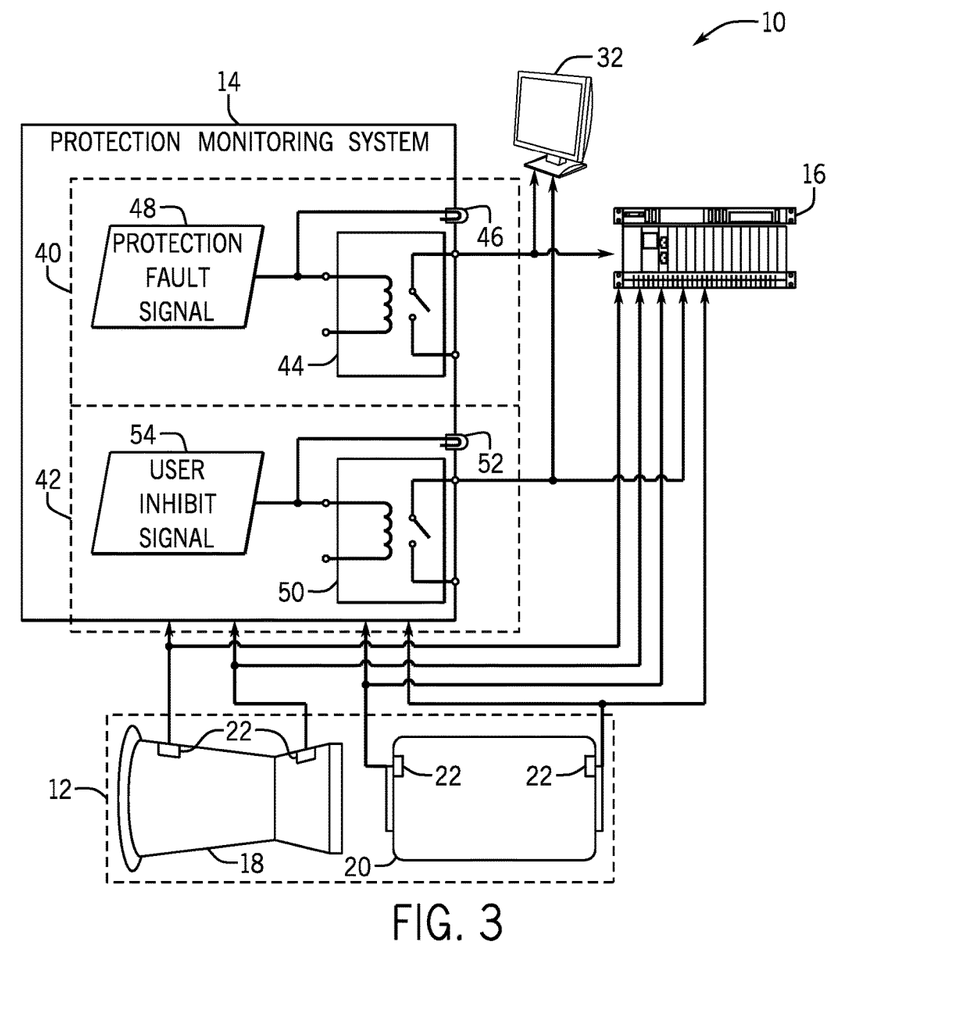
FIG. 3 is a schematic diagram view of an embodiment of the industrial automation system of FIG. 1 with a protection fault handler and a user inhibit handler.

FIG. 3 is a schematic diagram view of the industrial automation system 10 including the protection monitoring system 14 having a protection fault handler 40 and a user inhibit handler 42. When the protection monitoring system 14 and/or the control system 16 determined that a critical fault has occurred in the protection system 17, the protection monitoring system 14 directs critical errors that block protection of the machinery 12 to the protection fault handler 40. For example, critical errors may include errors pertaining to a critical path used such as a critical path sensor error, internal critical path hardware failures, and/or firmware for critical path is not functioning properly.

Similarly, in some embodiments, the protection monitoring system 14 directs user inhibit issues to the user inhibit handler 42. For example, user inhibit issues may include enabled bypasses or inhibits. Some embodiments of the industrial automation system 10 may enable a user to inhibit various alarms and/or bypass certain issues. For example, inhibit functions may include rack inhibit, rack alarm inhibits, special alarm inhibits, alert inhibits, danger inhibits, channel bypass, trip multiply, and/or other bypass/inhibit functions. A rack inhibit may disable all functions of the protection system 17 and/or the protection monitoring system 14 including alarms and other functions. Essentially, this type of inhibit causes the industrial automation system 10 to function as if no protection system 17 and/or protection monitoring system 14 is present. Conversely, a rack alarm inhibit suppresses alarms, but allows measured values to be displayed, while special alarms pertain to specific machine types.

Additionally, an alert alarm may be set to alert the user when an operating parameter surpasses a first threshold, but a danger alarm may be set when the operating parameter surpasses a second, higher threshold. Thus, an alert inhibit, when active, disables the alert when the first threshold is surpassed, and a danger inhibit, when enabled, disables an alarm when the second threshold is surpassed. Additionally, in certain embodiments, a channel of the protection system 17 may be disabled completely when a user desires to do so. However, a user may accidentally leave the channel disabled. Thus, an alert may be presented to inform the user that a channel is bypassed. Trip multiply enables the temporary elevation of alarm levels during certain periods (e.g., machine is in revolutions per minute (RPM) ranges corresponding to its resonance). For example, in some embodiments, the vibration sensor may be set to a pre-configured multiple (e.g., 2× or 3×) of the typical alarm. In certain embodiments, any alarms that are not classified as critical, may also be assigned to the user inhibit handler 42.

As illustrated, each handler 40, 42 in the protection monitoring system 14 includes an independently controlled indication system. In certain embodiments, the protection fault handler 40 may include a protection fault relay 44 and protection fault visual alert 46 that may be triggered upon the receipt or generation of a protection fault signal 48 by the protection monitoring system 14. For example, when the protection monitoring system 14 and/or the control system 16 determines that there is a broken wire, sensor 22 fault, and/or internal fault in a critical path of the protection system 17 of the machinery 12, the protection fault relay 44 trips and/or the protection fault visual alert 46 indicates that the protection has faulted. In certain embodiments, the protection fault handler 40 may include only the protection fault relay 44, the protection fault visual alert 46, and/or logic configured to display a protection fault visual alert via the HMI 32. In embodiments where the protection fault relay 44 is present, the protection fault relay 44 may be used to shut down the machinery 12 using the control system 16. Alternatively, the protection fault relay 44 may be used to perform emergency shutdown procedures (ESP) and/or toggle a damp valve that shuts down the machinery 12 directly.

In some embodiments, the user inhibit handler 42 include a user inhibit relay 50 and a user inhibit visual alert 52 that are each configured to indicate that a user inhibit/bypass function remains active in the protection system 17. For example, if a handler bypass is currently enabled in the industrial automation system 10, a user inhibit signal 54 is generated or received by the protection monitoring system 14. The user inhibit signal 54 causes the user inhibit relay 50 to trip, thereby causing the user inhibit information to be sent to the HMI 32 and/or the control system 16. In some embodiments, the user inhibit information may be used to shut down unprotected machinery 12 and/or the industrial automation system 10. In certain embodiments, the user inhibit handler may include the user inhibit relay 50, the user inhibit visual alert 52, a visual alert on the HMI 32, or any combination thereof. Furthermore, the user inhibit relay 50 may be coupled to a light source (e.g., LED), an operator machine, the HMI 32, or some combination thereof. In certain embodiments, when the user inhibit relay 50 is tripped, the user inhibit relay 50 may cause the light source to blink/change colors, may cause a display of an alert via the operator machine and/or the HMI 32, and/or may generate another suitable alarm for alerting an operator that a bypass or inhibit function is active in the protection system 17.

Figure 4:
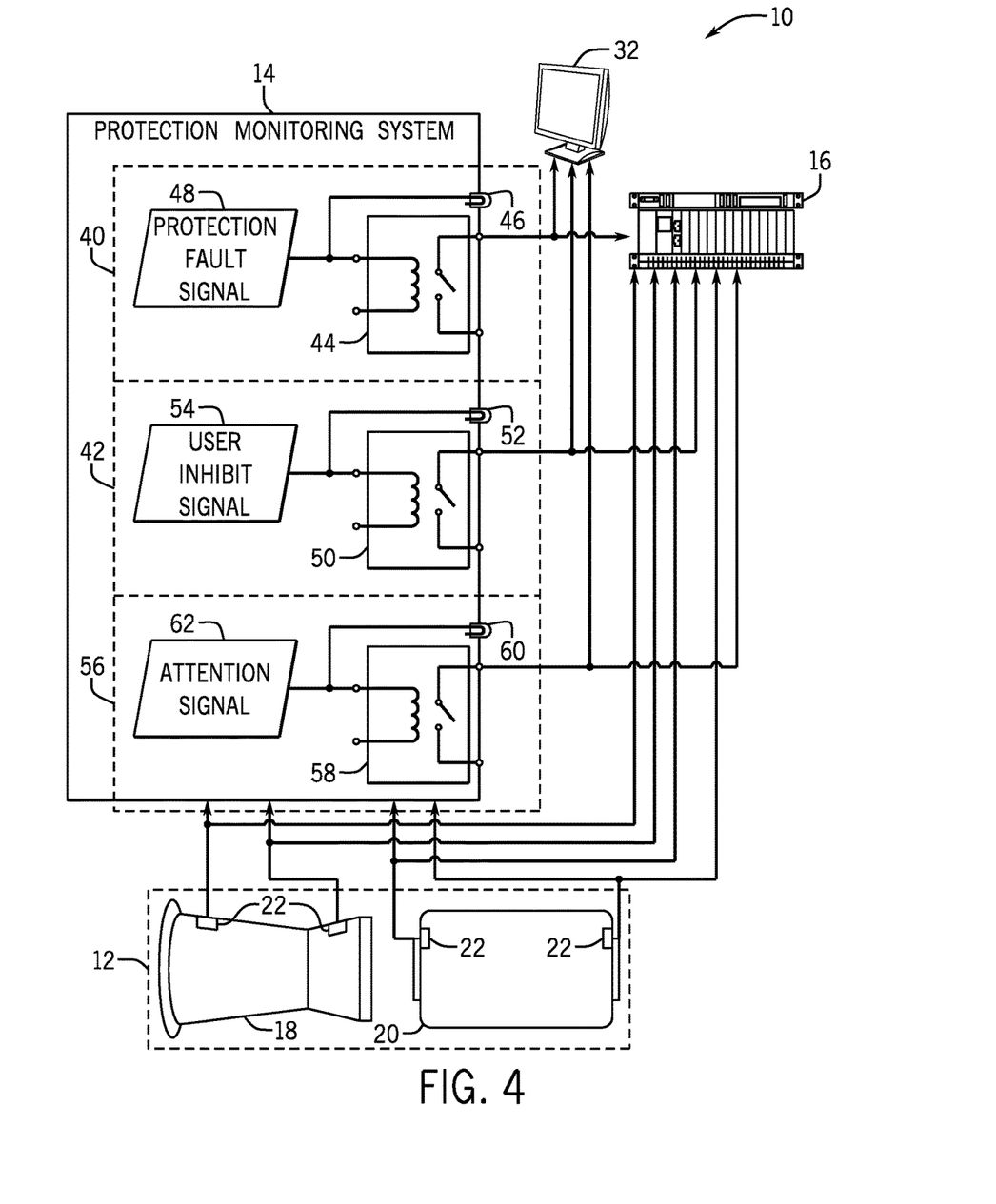
FIG. 4 is a schematic diagram view of an embodiment of the industrial automation system of FIG. 1 with a protection fault handler, a user inhibit handler, and an attention handler.

FIG. 4 is a schematic diagram view of the industrial automation system 10 including a protection monitoring system 14 having the protection fault handler 40, the user inhibit handler 42, and an attention handler 56. In the illustrated embodiment, the attention handler 56 includes an attention relay 58 and an attention visual alert 60. However, some embodiments of the attention handler 56 may include the attention relay 58, the attention visual alert 60, a visual alert via the HMI 32, or some combination thereof. Similar to the protection fault relay 44 and the user inhibit relay 50, the attention relay 58 may trip in response to the protection monitoring system 14 generating or receiving an attention signal 62. The attention signal 62 may be generated when various non-critical faults and/or non-user inhibit events are present in the protection system 17. For example, in some embodiments, the attention signal 62 may be generated when unacknowledged important system events have occurred (e.g., certain modes are enabled/disabled, certain operating parameter values occur, etc.), hardware faults occur on non-critical paths, and/or any other miscellaneous events or faults not captured in the protection fault signal 48 or user inhibit signal 54. In certain embodiments, once an important system event has been acknowledged, the attention relay 58 and/or the attention visual alert 60 may be reset.

In certain embodiments, the attention relay 58 may cause an attention visual alert 60 to draw an operator's attention via a light source (e.g., LED), an operator machine, the HMI 32, or some combination thereof. In certain embodiments, when the attention relay 58 is tripped, the attention relay 58 may cause the attention visual alert 60 to blink/change colors, may cause a display of an alert via the operator machine and/or the HMI 32, and/or may generate another suitable alarm for alerting an operator that an unacknowledged important event has occurred or a non-critical fault is active in the protection system 17. In some embodiments of the protection monitoring system 14 having the attention relay 58, the attention relay 58 may send a signal to the control system 16, shut down machinery 12 and/or the industrial automation system 10 using the control system 16, shut down monitored machinery 12 and/or the industrial automation system 10 using ESP, shut down the monitored machinery 12 and/or industrial automation system 10 directly using a dump valve, and/or perform other suitable processing to alert the user and/or shut down at least a portion of the industrial automation system 10.

Figure 5:
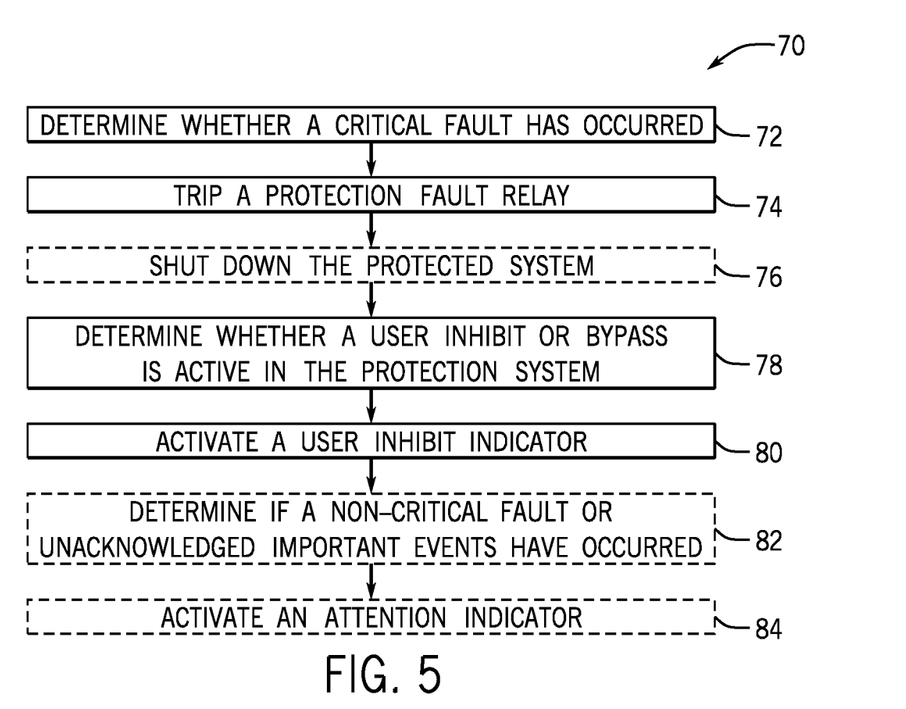
FIG. 5 is a flow chart view of an embodiment of a method for monitoring a protection system of an industrial automation system.

FIG. 5 is a flow chart view illustrating an embodiment of a method 70 for monitoring a protection system, such as protection system 17, for an industrial automation system, such as industrial automation system 10. In certain embodiments, the method 70 may be implemented using software stored on a computing device (e.g., electronic device having a processor). For example, in some embodiments, the method 70 may be implemented as instructions stored on a non-tangible, computer-readable medium, such as memory, a disk drive, an optical drive, or other type of storage. In certain embodiments, these instructions may be stored and/or executed by the control system 16, an operator machine, or a remote server. In other embodiments, the method 70 may be implemented using hardware circuitry, as described above. The method 70 includes determining whether a critical fault has occurred in the protection system 17 (block 72). As previously discussed, critical faults may pertain to wire breakages or sensor faults pertaining to a critical path of the protection system 17. In some embodiments, the protection monitoring system 14 may determine a critical fault based on returned values from the sensor 22. In other embodiments, the control system 16 may send values to the protection monitoring system 14. When these values correspond to critical path faults, the protection monitoring system 14 may determine that a critical fault has occurred. Alternatively, the control system 16 may determine that a critical fault has occurred and send a critical fault signal (e.g., protection fault signal 40) to the protection monitoring system 14. Upon determination that a critical fault has occurred, the protection monitoring system 14 trips the protection fault relay 44 (block 74). In some embodiments, the protection monitoring system 14 may shut down the machinery 12 that is no longer protected and/or the industrial automation system 10 upon a trip of the protection fault relay 44 (block 76). For example, a trip of the protection fault relay 44 may send a signal to the control system 16 to shut down the system, may initiate an ESP shutdown, and/or shut down the industrial automation system 10 using a dump valve. Additionally or alternatively, the protection fault relay 44 may cause a blinking light (e.g., the protection fault visual alert 46) and/or indication on an operator machine and/or another display (e.g., HMI 32).

The method 70 also includes determining whether a user inhibit or bypass is active in the protection system (block 78). For example, in some embodiments, the control system 16 may send the protection monitoring system 14 a user inhibit signal 54 indicating that a handler bypass, an alarm inhibit, trip multiply, a rack inhibit, or other user-selected inhibiting functions remain active in the protection system 17. Upon determining that an inhibit function is active in the protection system 17, the protection monitoring system 14 activates a user inhibit indicator (block 80). In some embodiments, the user inhibit indicator may include a user inhibit relay and/or LED (e.g., the user inhibit visual indicator 52). Upon activation of the user inhibit indicator having an LED, the LED may flash or blink. Upon activation of the user inhibit indicator having a relay, some embodiments of the user inhibit relay may cause a blinking light to be displayed, may cause display of an alert on an operator machine, may cause an alert on the HMI 32 in the form of a visual or audible alarm, may cause another suitable alert, or some combination thereof.

Some embodiments of the method 70 also include determining if a non-critical fault or unacknowledged important events have occurred (block 82). For example, non-critical faults and/or important events in the industrial automation system 10 may be tracked by the control system 16 and/or the protection monitoring system 14, such as a power level is reached, the ambient temperature has changed, a new mode has been selected, etc. In certain embodiments, the important events may be acknowledged by a user (e.g., operator) causing the important event to be ignored. Upon determination that a non-critical fault and/or unacknowledged important event has occurred, the protection monitoring system 14 may activate an attention indicator (block 84). In some embodiments, when an unacknowledged important event is acknowledged, the attention indicator may be reset, if the currently acknowledged event was the sole cause of the activation of the attention indicator. In some embodiments, the attention indicator may include an attention relay and/or LED. Upon activation of the attention indicator having an LED, the LED may flash or blink. Upon activation of the attention indicator having a relay, the attention relay may cause a blinking light to be displayed, may cause display of an alert on an operator machine, may cause an alert on the HMI 32 in the form of a visual or audible alarm, may cause another suitable alert, or some combination thereof.

This written description uses examples to disclose the above description, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A protection monitoring system comprising:
a protection fault relay configured to activate upon receipt of a protection fault signal, wherein the protection fault signal is indicative of a critical fault which has occurred in a protection system monitored by the protection monitoring system, wherein the protection fault relay triggers for the critical fault and shuts down an industrial automation system protected by the protection system; and
a secondary relay configured to alleviate potential congestion of the protection fault relay and to block potential shutdown for bypasses or non-critical faults, wherein the secondary relay is configured to activate upon indication of a user inhibit signal, and the user inhibit signal is indicative of a user-enabled alarm inhibit or a user-enabled bypass, and the protection fault relay and the secondary relay are arranged in parallel to each other to operate independently of each other.

2. The protection monitoring system of claim 1, comprising an attention handler comprising an attention indicator, wherein the attention handler is configured to activate the attention indicator upon indication of an attention signal, wherein the attention signal is indicative of a non-critical fault which has occurred in the protection system or an unacknowledged important system event which has occurred in the industrial automation system protected by the protection system.

3. The protection monitoring system of claim 2, wherein the industrial automation system comprises machinery.

4. The protection monitoring system of claim 1, wherein the industrial automation system comprises turbomachinery.

5. The protection monitoring system of claim 1, wherein the protection fault relay is configured to shutdown machinery protected by the protection system when the protection fault relay receives a protection fault signal.

6. The protection monitoring system of claim 5, wherein the protection fault relay is configured to shut down the machinery via a control system for the industrial automation system, via initiating an emergency shutdown procedure (ESP), via using a dump valve, or by some combination thereof.

7. The protection monitoring system of claim 1, wherein the protection fault relay comprises a protection fault visual indicator that is configured to indicate that the protection fault signal has been received.

8. The protection monitoring system of claim 7, wherein the protection fault visual indicator is a light emitting diode (LED).

9. The protection monitoring system of claim 1, comprising a protection fault indicator causes a protection fault visual indicator to be displayed via a human machine interface (HMI) indicative of the user inhibit signal.

10. An industrial automation system comprising:
a protection system configured to protect machinery; and
a protection monitoring system comprising:
a protection fault relay configured to activate upon receipt of a protection fault signal, wherein the protection fault signal is indicative of a first type of alert related to a fault in a critical path of the protection system, wherein the protection fault relay triggers for the first type of alert and shuts down an industrial automation system protected by the protection system; and
a secondary relay configured to alleviate potential congestion of the protection fault relay and to block potential shutdown for bypasses or non-critical faults, wherein the secondary relay is configured to activate upon receipt of a second type of alert comprising an inhibit, and the protection fault relay and the secondary relay are arranged in parallel to each other to operate independently of each other.

11. The industrial automation system of claim 10 comprising an attention indicator configured to activate when a third type of alert related to changes in operation of the industrial automation system or alert types not classified as the first or second type is detected.

12. The industrial automation system of claim 10, wherein the first type of alert comprises a broken wire in a critical path of the protection system, a fault in a sensor in a critical path of the protection system, or some combination thereof.

13. The industrial automation system of claim 10, wherein the inhibit is configured to suppress the protection system from functioning or to suppress alarms that would occur in the protection system absent the inhibit.

14. The industrial automation system of claim 10, wherein the inhibit comprises a channel bypass, wherein the channel bypass comprising disabling a channel in the industrial automation system.

15. The industrial automation system of claim 10, wherein the industrial automation system comprises machinery, wherein the machinery comprises an engine, a compressor, a combustor, a conveyer belt, a generator, a pump, a turbo expander, or some combination thereof.

16. The industrial automation system of claim 10, wherein the protection fault relay is configured to shutdown machinery via an emergency shutdown procedures (ESP) upon detection of the first type of alert in the protection system.

17. The industrial automation system of claim 10, comprising a protection fault visual indicator configured to activate upon detection of the first type of alert in the protection system.

18. A non-transitory computer-readable medium comprising instructions, wherein the instructions are configured to:

receive, at a protection monitoring system, a protection fault signal, wherein the protection fault signal is indicative of a critical fault which has occurred in a protection system monitored by the protection monitoring system;

upon receipt of the protection fault signal, trip a protection fault relay to shut down an industrial automation system protected by the protection system;

receive, at the protection monitoring system, a user inhibit signal or bypass indicative of a user-enabled alarm inhibit or a user-enabled bypass; and upon receipt of the user inhibit signal, trip a secondary relay, wherein the protection fault relay and the secondary relay are arranged in parallel to each other to operate independently of each other.

19. The non-transitory computer-readable medium of claim 18, wherein the instructions are configured to:

determine whether a non-critical fault or an unacknowledged important event has occurred in the industrial automation system protected by the protection system; and if the non-critical fault or the unacknowledged important event has occurred has occurred, activate an attention indicator.

20. The non-transitory computer-readable medium of claim 18, wherein the instructions are configured to shut down machinery in the industrial automation system via the protection fault relay using a dump valve.

* * * * *